US011427986B2

(12) United States Patent
Pitts

(10) Patent No.: US 11,427,986 B2
(45) Date of Patent: *Aug. 30, 2022

(54) DOOR ACTIVATED INTERLOCK SYSTEM FOR A WORK VEHICLE

(71) Applicant: CNH Industrial America LLC, New Holland, PA (US)

(72) Inventor: Cory Robert Pitts, Wichita, KS (US)

(73) Assignee: CNH Industrial America LLC, New Holland, PA (US)

( * ) Notice: Subject to any disclaimer, the term of this patent is extended or adjusted under 35 U.S.C. 154(b) by 313 days.

This patent is subject to a terminal disclaimer.

(21) Appl. No.: 16/736,461

(22) Filed: Jan. 7, 2020

(65) Prior Publication Data

US 2020/0141087 A1 May 7, 2020

Related U.S. Application Data

(63) Continuation of application No. 15/392,869, filed on Dec. 28, 2016, now Pat. No. 10,683,637.

(51) Int. Cl.
| | |
|---|---|
| *G05D 1/00* | (2006.01) |
| *E02F 9/20* | (2006.01) |
| *E02F 3/84* | (2006.01) |
| *E02F 9/24* | (2006.01) |
| *E02F 3/76* | (2006.01) |
| *E02F 3/96* | (2006.01) |

(52) U.S. Cl.
CPC .............. *E02F 9/2025* (2013.01); *E02F 3/84* (2013.01); *E02F 9/24* (2013.01); *G05D 1/0055* (2013.01); *E02F 3/7604* (2013.01); *E02F 3/961* (2013.01)

(58) Field of Classification Search
CPC ................. G05D 1/0055; E02F 9/2025; E02F 3/84–841; E02F 9/24; E02F 3/7604; E02F 3/961; E02F 3/3414; E02F 3/963; E02F 9/0891; E02F 3/16; E02F 3/26; E02F 9/2033–2037; E02F 9/26; A01D 34/828; B60W 30/08; B60W 2300/121; B60W 2300/15–17; F16P 7/00
USPC .............. 701/50, 36, 49; 37/195, 466; 75/20
See application file for complete search history.

(56) References Cited

U.S. PATENT DOCUMENTS

| | | | |
|---|---|---|---|
| 4,655,634 | A | 4/1987 | Loy et al. |
| 5,425,431 | A | 6/1995 | Brandt et al. |
| 6,647,328 | B2 | 11/2003 | Walker |
| 7,080,708 | B2 | 7/2006 | Wherley |
| 7,222,691 | B2 | 5/2007 | Menebroker et al. |
| 7,235,901 | B2 | 6/2007 | Bares et al. |
| 7,983,812 | B2 | 7/2011 | Potter |

(Continued)

*Primary Examiner* — Bao Long T Nguyen
(74) *Attorney, Agent, or Firm* — Peter Zacharias; Patrick Sheldrake

(57) ABSTRACT

An interlock system for a work vehicle includes a controller configured to output instructions to a first actuator assembly to control a first implement positioned rearward of a chassis of the work vehicle. The controller is configured to instruct the first actuator assembly to block movement of the first implement while an access door of the chassis is in an open state, in which the access door is positioned on a rear portion of the chassis, longitudinally opposite a cab ingress/egress door positioned proximate to a forward portion of the chassis, and the controller is configured to output instructions to a second actuator assembly to control a second implement positioned forward of the chassis.

20 Claims, 5 Drawing Sheets

(56) References Cited

U.S. PATENT DOCUMENTS

| | | | |
|---|---|---|---|
| 9,815,459 | B2 | 11/2017 | Sasabuchi et al. |
| 10,683,637 | B2 * | 6/2020 | Pitts .......................... E02F 9/24 |
| 2003/0192732 | A1 | 10/2003 | Warkentine |
| 2005/0222733 | A1 | 10/2005 | Merten et al. |
| 2009/0271077 | A1 | 10/2009 | Goodrich |
| 2010/0326481 | A1 | 12/2010 | Buckner |
| 2011/0282555 | A1 | 11/2011 | Kimmet |
| 2011/0286788 | A1 | 11/2011 | Sikorski et al. |
| 2012/0173092 | A1 * | 7/2012 | Sorby .................. E02F 9/2033 701/50 |
| 2015/0136560 | A1 | 5/2015 | Deo et al. |
| 2015/0291102 | A1 | 10/2015 | Smith |
| 2016/0082975 | A1 | 3/2016 | Lovett et al. |

\* cited by examiner

DOOR ACTIVATED INTERLOCK SYSTEM FOR A WORK VEHICLE

CROSS REFERENCE TO RELATED APPLICATIONS

This application is a continuation of U.S. patent application Ser. No. 15/392,869, entitled "DOOR ACTIVATED INTERLOCK SYSTEM FOR A WORK VEHICLE," filed Dec. 28, 2016, and is hereby incorporated by reference in its entirety for all purposes.

BACKGROUND

The present disclosure relates generally to a door activated interlock system for a work vehicle.

Certain work vehicles (e.g., tractors, harvesters, skid steers, etc.) include a cab configured to house an operator and an chassis configured to support the cab. The chassis is also configured to support wheels and/or tracks to facilitate movement of the work vehicle relative to a ground surface. In addition, various mechanical components of the work vehicle, such as a motor, a transmission, and a hydraulic system, among other components, may be supported by the chassis and/or disposed within an interior of the chassis. Furthermore, one or more implements (e.g., a dozer blade, a grapple, etc.) may be movably coupled to the chassis. In addition, one or more movable components (e.g., a door of the cab that facilitates ingress and egress of the operator, etc.) may be movably coupled to the cab or to the chassis. Unfortunately, in certain work vehicles, the implement(s) (e.g., while the implement(s) are in certain position(s)) may interfere with movement of the movable component(s), and/or the movable component(s) (e.g., while the movable component(s) are in certain position(s)) may interfere with movement of the implement(s).

BRIEF DESCRIPTION

In one embodiment, an interlock system for a work vehicle includes a controller configured to output instructions to a first actuator assembly to control a first implement positioned rearward of a chassis of the work vehicle. The controller is configured to instruct the first actuator assembly to block movement of the first implement while an access door of the chassis is in an open state, in which the access door is positioned on a rear portion of the chassis, longitudinally opposite a cab ingress/egress door positioned proximate to a forward portion of the chassis, and the controller is configured to output instructions to a second actuator assembly to control a second implement positioned forward of the chassis.

In one embodiment, an interlock system for a work vehicle includes a controller configured to instruct a drive system of the work vehicle to block movement of the work vehicle relative to a ground surface while an access door of a chassis is in an open state. The access door is positioned on a rear portion of the chassis, longitudinally opposite a cab ingress/egress door positioned proximate to a forward portion of the chassis, and the controller is configured to output instructions to an actuator assembly to control an implement positioned forward of the chassis.

In one embodiment, an interlock system for a work vehicle includes a sensor configured to output a signal indicative of a state of an access door positioned on an opposite longitudinal side of the work vehicle from a cab ingress/egress door, in which the access door is configured to transition between an open state and a closed state. The interlock system also includes a first actuator assembly configured to control a position of a first implement positioned rearward of the access door relative to a forward direction of travel and a controller communicatively coupled to the sensor and to the first actuator assembly. The controller is configured to receive the signal and to instruct the first actuator assembly to block movement of the first implement while the access door is in the open state, and the controller is configured to output instructions to a second actuator assembly to control a second implement positioned forward of the cab ingress/egress door relative to the forward direction of travel.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
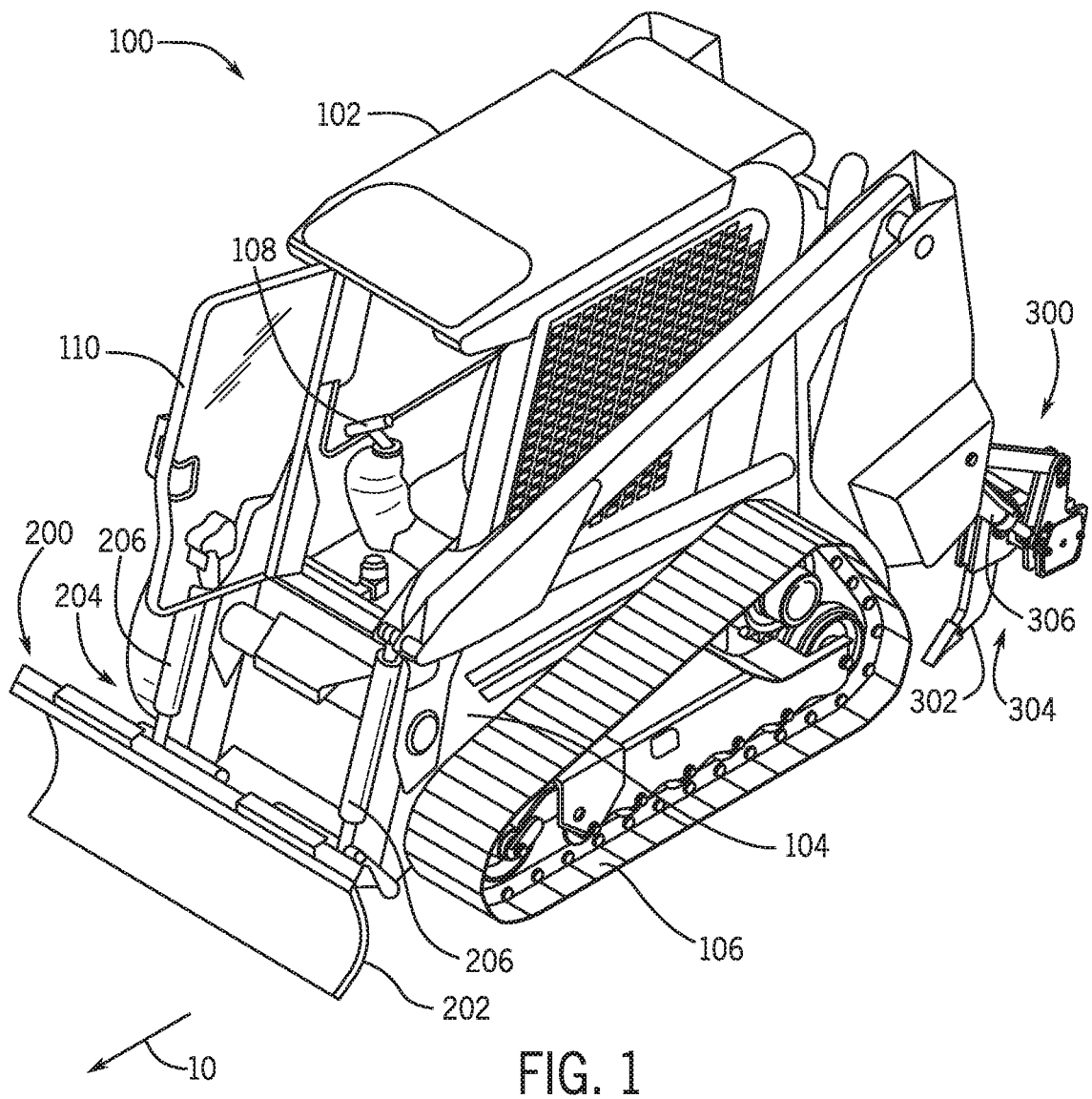
FIG. 1 is a front perspective view of an embodiment of a work vehicle that may include a door activated interlock system.
Figure 1:
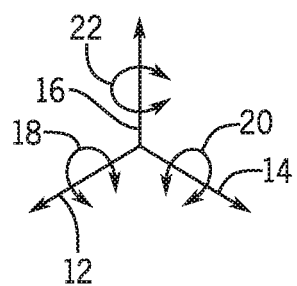

FIG. 1 is a front perspective view of an embodiment of a work vehicle 100 that may include a door activated interlock system. In the illustrated embodiment, the work vehicle 100 is a skid steer. However, it should be appreciated that the door activated interlock system disclosed herein may be utilized on other work vehicles, such as on-road trucks, tractors, harvesters, and construction equipment, among other work vehicles. In the illustrated embodiment, the work vehicle 100 includes a cab 102 and a chassis 104. In certain embodiments, the chassis 104 is configured to house a motor (e.g., diesel engine, etc.), a hydraulic system (e.g., including a pump, valves, a reservoir, etc.), and other components (e.g., an electrical system, a cooling system, etc.) that facilitate operation of the work vehicle. In addition, the chassis 104 is configured to support the cab 102 and tracks 106. The tracks 106 may be driven to rotate by the motor and/or by component(s) of the hydraulic system (e.g., hydraulic motor(s), etc.). While the illustrated work vehicle 100 includes tracks 106, it should be appreciated that in alternative embodiments, the work vehicle may include wheels or a combination of wheels and tracks.

The cab 102 is configured to house an operator of the work vehicle 100. Accordingly, various controls, such as the illustrated hand controller 108, are positioned within the cab 102 to facilitate operator control of the work vehicle 100. For example, the controls may enable the operator to control the rotational speed of the tracks 106, thereby facilitating adjustment of the speed and/or the direction of the work vehicle 100. In the illustrated embodiment, the cab 102 includes a door 110 to facilitate ingress and egress of the operator from the cab 102.

In the illustrated embodiment, the work vehicle 100 includes a front implement assembly 200 having a front implement, such as the illustrated dozer blade 202. As illustrated, the dozer blade 202 is positioned forward of the chassis 104 relative to a forward direction of travel 10. In addition, the front implement assembly 200 includes a front implement actuator assembly 204 to control a position of the dozer blade 202 relative to the chassis 104. In the illustrated embodiment, the front implement actuator assembly 204 includes hydraulic cylinders 206 configured to move the dozer blade 202 relative to the chassis 104. In addition, the front implement actuator assembly may include a valve assembly configured to control hydraulic fluid flow to the hydraulic cylinders, thereby controlling the position and/or orientation of the dozer blade. In certain embodiments, the front implement actuator assembly 204 may be configured to move the dozer blade 202 along a longitudinal axis 12 of the work vehicle 100, along a lateral axis 14 of the work vehicle 100, along a vertical axis 16 of the work vehicle 100, or a combination thereof. In addition, the front implement actuator assembly 204 may be configured to rotate the dozer blade 202 about the longitudinal axis 12 in roll 18, about the lateral axis 14 in pitch 20, about the vertical axis 16 in yaw 22, or a combination thereof. While the front implement assembly includes a dozer blade in the illustrated embodiment, it should be appreciated that in alternative embodiments, the front implement assembly may include other suitable type(s) of implement(s) (e.g., a broom, an auger, a grapple, etc.). In addition, while the front implement actuator assembly includes hydraulic cylinders in the illustrated embodiment, it should be appreciated that in alternative embodiments, the front implement actuator assembly may include other suitable type(s) of actuator(s), such as hydraulic motor(s), pneumatic actuator(s), or electromechanical actuator(s), among others.

In the illustrated embodiment, the work vehicle 100 includes a rear implement assembly 300 having a rear implement 302, such as the illustrated ripper. As illustrated, the rear implement 302 is positioned rearward of the chassis 104 relative to the forward direction of travel 10. In addition, the rear implement assembly 300 includes a rear implement actuator assembly 304 to control a position of the rear implement 302 relative to the chassis 104. In the illustrated embodiment, the rear implement actuator assembly 304 includes hydraulic cylinders 306 configured to move the rear implement 302 relative to the chassis 104. In addition, the rear implement actuator assembly may include a valve assembly configured to control hydraulic fluid flow to the hydraulic cylinders, thereby controlling the position and/or orientation of the ripper. In certain embodiments, the rear implement actuator assembly 304 may be configured to move the rear implement 302 along the longitudinal axis 12 of the work vehicle 100, along the lateral axis 14 of the work vehicle 100, along the vertical axis 16 of the work vehicle 100, or a combination thereof. In addition, the rear implement actuator assembly 304 may be configured to rotate the rear implement 302 about the longitudinal axis 12 in roll 18, about the lateral axis 14 in pitch 20, about the vertical axis 16 in yaw 22, or a combination thereof. While the rear implement assembly includes a ripper in the illustrated embodiment, it should be appreciated that in alternative embodiments, the rear implement assembly may include other suitable type(s) of implement(s) (e.g., a mower, a backhoe, etc.). In addition, while the rear implement actuator assembly includes hydraulic cylinders in the illustrated embodiment, it should be appreciated that in alternative embodiments, the rear implement actuator assembly may include other suitable type(s) of actuator(s), such as hydraulic motor(s), pneumatic actuator(s), or electromechanical actuator(s), among others.

As discussed in detail below, the work vehicle may include a door activated interlock configured to selectively block movement of the rear implement while a rear access door is in an open state. For example, in certain embodiments, the interlock system includes a sensor configured to output a signal indicative of a state of an access door positioned on a rear portion of the chassis of the work vehicle relative to the forward direction of travel. In certain embodiments, the access door is configured to facilitate access to an interior of the chassis while in an open state and to substantially block access to the interior of the chassis while in a closed state. The interlock system also includes an actuator assembly (e.g., the rear implement actuator assembly) configured to control a position of an implement (e.g., the rear implement) positioned rearward of the chassis relative to the forward direction of travel. In addition, the interlock system includes a controller communicatively coupled to the sensor and to the actuator assembly. The controller is configured to receive the signal and to instruct the actuator assembly to block movement of the implement while the access door is in the open state. Accordingly, the possibility of contact between the implement and the access door is substantially reduced or eliminated. In certain embodiments, the controller is configured to instruct a drive system of the work vehicle to block movement of the work vehicle relative to the ground surface while the access door is in the open state, thereby substantially reducing or eliminating the possibility of vehicle movement while the access door is in the open state.

Figure 2A:
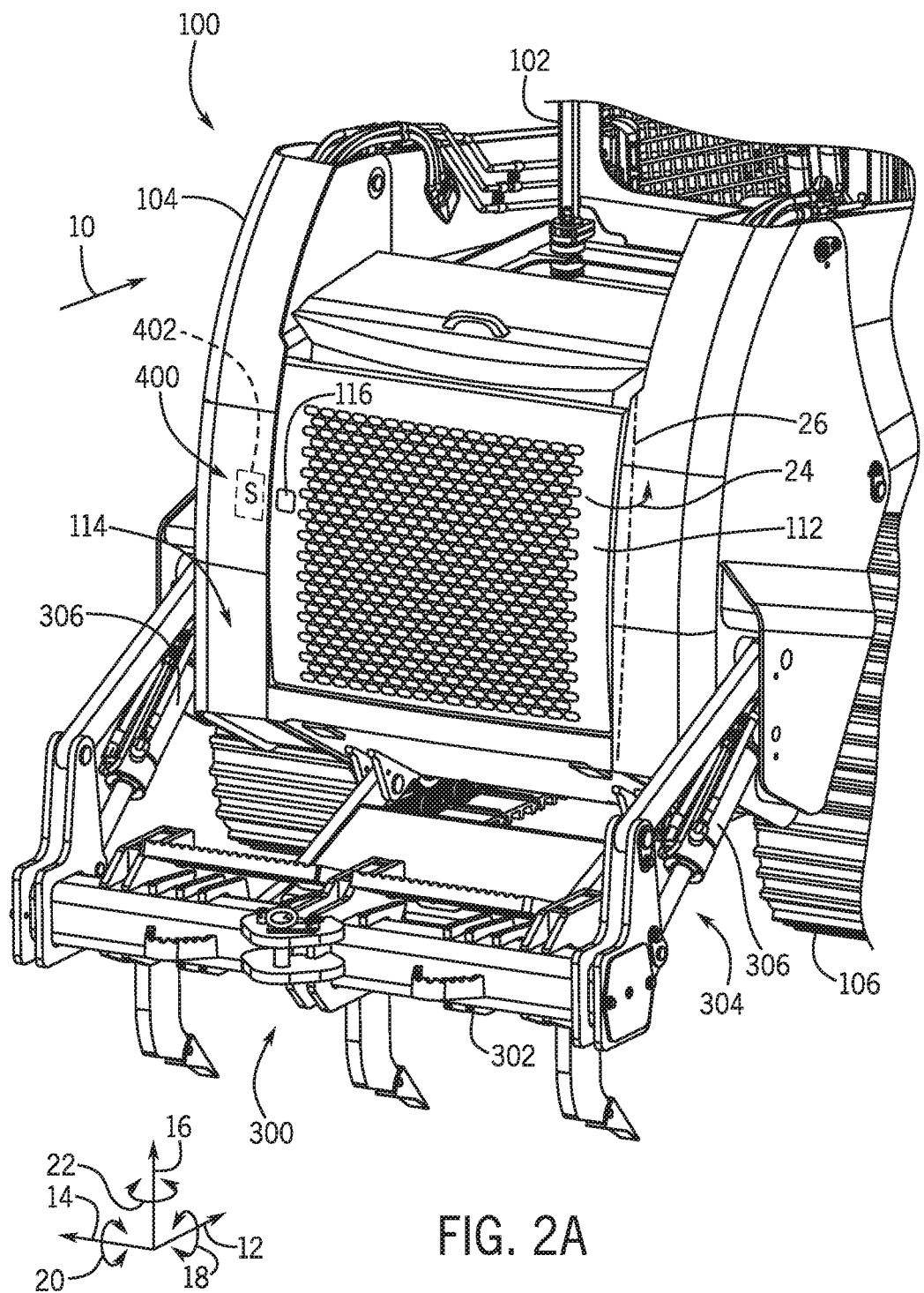
FIG. 2A is a back perspective view of the work vehicle of FIG. 1, in which a rear implement is in a lowered position and an access door is in a closed state.

FIG. 2A is a back perspective view of the work vehicle 100 of FIG. 1, in which the rear implement 302 is in a lowered position and an access door 112 is in a closed state. In the illustrated embodiment, the access door 112 is positioned on a rear portion 114 of the chassis 104 relative to the forward direction of travel 10. The access door 112 is configured to transition (e.g., rotate) between the illustrated closed position (e.g., that substantially blocks access to an interior of the chassis 104) and an open state (e.g., that facilitates access to the interior of the chassis 104). In the illustrated embodiment, the access door 112 is configured to rotate in a direction 24 about a door rotation axis 26, which is substantially parallel to the vertical axis 16, between the illustrated closed state and the open state. However, it should be appreciated that in alternative embodiments, the door may rotate about any other suitable axis to transition between the open and closed states. In addition, in certain embodiments, the door may be configured to translate (e.g., slide along the vertical axis, etc.) to transition between the open and closed states. Furthermore, in certain embodiments, the work vehicle 100 includes a latch mechanism 116 configured to secure the access door in the closed state while the latch mechanism is engaged.

In the illustrated embodiment, the work vehicle 100 includes an interlock system 400 having a sensor 402 configured to output a signal indicative of the state of the access door 112. In certain embodiments, the sensor 402 includes a non-contact sensor, such as a magnetic sensor, an inductive sensor, a capacitance sensor, an infrared sensor, an ultrasonic sensor, another suitable type of non-contact sensor, or a combination thereof. In further embodiments, the sensor may include a contact sensor, such as a push switch, among others. Furthermore, the sensor may include an electrical contact switch configured to establish an electrical connection while the access door is in the closed state. In the illustrated embodiment, the sensor 402 is positioned on the chassis 104 proximate to the access door 112. However, it should be appreciated that in alternative embodiments, the sensor may be positioned on the access door or in a location remote from the access door (e.g., connected to the access door by a cable, configured to determined the position of the access door by receiving a reflected electromagnetic signal, etc.). As discussed in detail below, the interlock system also includes a controller communicatively coupled to the sensor 402. The controller is configured to receive the signal from the sensor and to instruct the rear actuator assembly 304 to block movement of the rear implement 302 while the access door 112 is in the open state. Accordingly, the possibility of the rear implement contacting the access door while the access door is in the open position is substantially reduced or eliminated.

In certain embodiments, the access door may be considered to be in the open state while an opening to the interior of the chassis is established. For example, rotating the access door in the direction 24 beyond an opening angle relative to the illustrated closed position of the access door may establish an opening to the interior of the chassis. By way of example, the opening angle may be at least 1 degree, at least 2 degrees, at least 3 degrees, at least 5 degrees, at least 10 degrees, or at least 15 degrees. With the access door rotated beyond the opening angle, an opening to the interior of the chassis is established, thereby facilitating access to the interior of the chassis and placing the door in the open state. In further embodiments, the access door may be considered to be in the open state while at least a portion of the access door (e.g., a lateral end of the access door opposite the rotation axis, etc.) is separated (e.g., not in contact with) the chassis. Furthermore, in certain embodiments, the access door may be considered to be in the open state while the latch mechanism is disengaged (e.g., even while the access door is oriented/positioned in the closed position). In such embodiments, the sensor may be configured to output a signal indicative of the state of the latch mechanism to enable the controller to determine whether the access door is in the open state (e.g., with the latch mechanism disengaged) or in the closed state (e.g., with the access door in the closed position and the latch mechanism engaged).

Figure 2B:
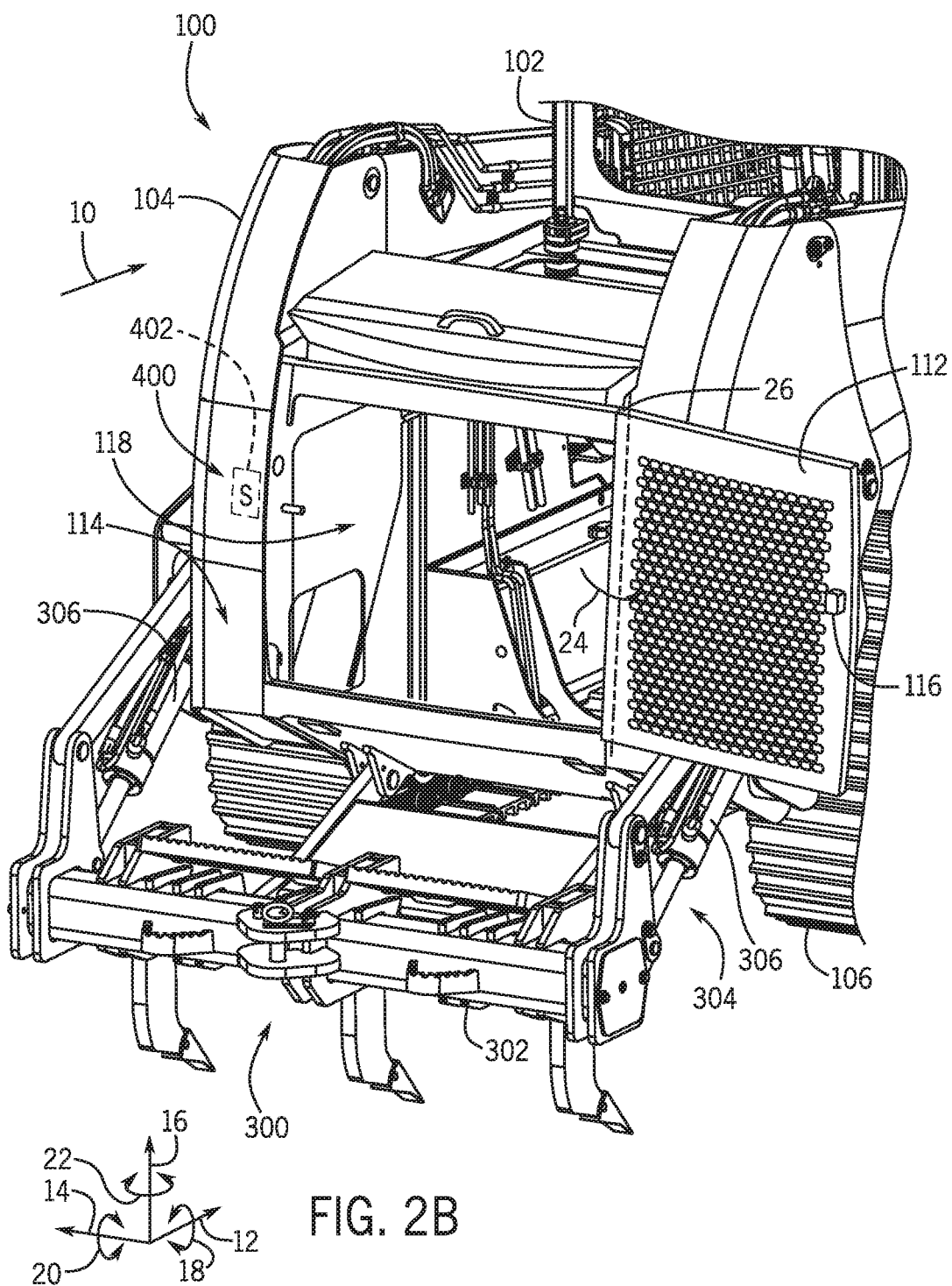
FIG. 2B is a back perspective view of the work vehicle of FIG. 1, in which the rear implement is in the lowered position and the access door is in an open state.

FIG. 2B is a back perspective view of the work vehicle of FIG. 1, in which the rear implement 302 is in the lowered position and the access door 112 is in the open state. As illustrated, with the access door 112 in the illustrated open state, an operator may access the interior 118 of the chassis 104. As previously discussed, while the access door 112 is in the illustrated open state, the controller of the interlock system 400 is configured to instruct the rear implement actuator assembly 304 to block movement of the rear implement 302. As a result, the possibility of contact between the rear implement and the access door is substantially reduced or eliminated.

In certain embodiments, the controller is configured to instruct the drive system (e.g., engine, transmission, braking system, etc.) to block movement of the work vehicle relative to the ground surface while the access door 112 is in the illustrated open state. For example, the controller may be configured to instruct a valve assembly to block fluid flow to a hydraulic drive motor, the controller may be configured to instruct a transmission to transition into a neutral state, the controller may be configured to instruct a braking system to activate, or a combination thereof, among other suitable actions for blocking movement of the work vehicle. Accordingly, the possibility of the work vehicle moving while the access door is in the open state is substantially reduced or eliminated. In certain embodiments, the controller is configured to instruct the front implement actuator assembly to enable movement of the front implement while the access door is in the open state and while the access door is in the closed state. Accordingly, an operator may move the front implement regardless of the state of the access door because the front implement is positioned remote from the access door.

Figure 2C:
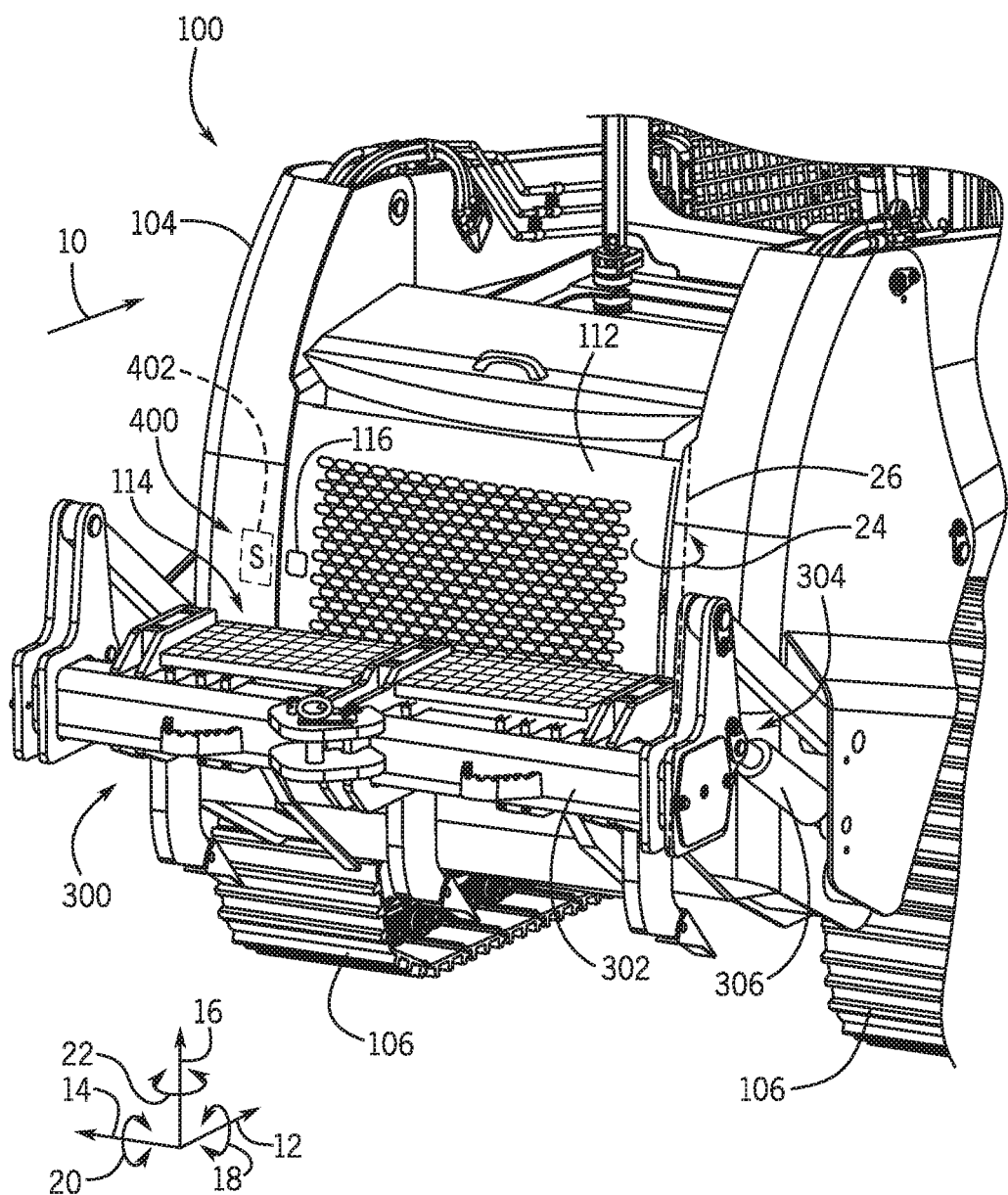
FIG. 2C is a back perspective view of the work vehicle of FIG. 1, in which the rear implement is in a raised position and the access door is in the closed state.

FIG. 2C is a back perspective view of the work vehicle of FIG. 1, in which the rear implement 302 is in a raised position and the access door 112 is in the closed state. As illustrated, with the rear implement 302 in the raised position, the access door 112 may be rotated in the direction 24 until the access door contacts the rear implement. However, the angle of the access door may be insufficient to facilitate access to the interior of the chassis. Accordingly, to access the interior of the chassis, the rear implement may be lowered (e.g., to the position shown in FIG. 2A) before opening the access door. For example, the access door may be transitioned to the closed state to enable movement of the rear implement, and then the rear implement may be positioned to enable the access door to be transitioned to the open state.

Figure 3:
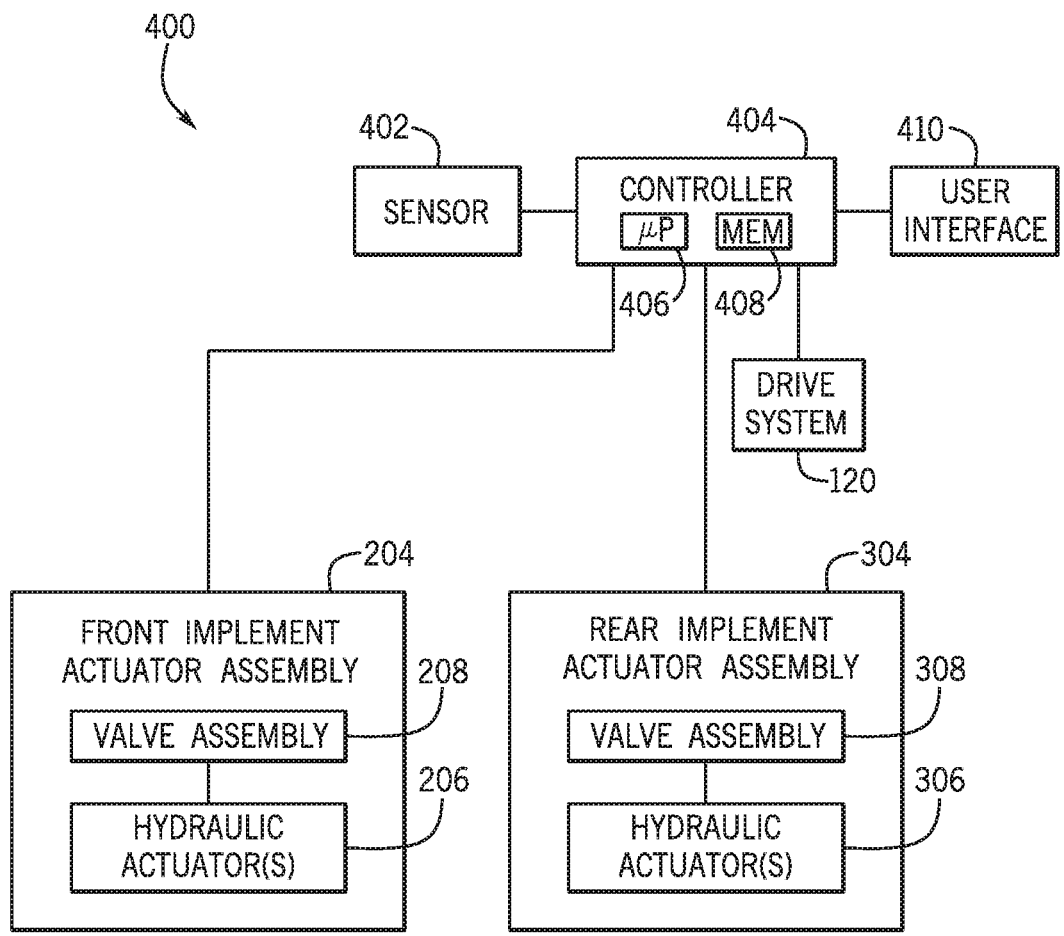
FIG. 3 is a block diagram of an embodiment of a door activated interlock system that may be employed within the work vehicle of FIG. 1.

FIG. 3 is a block diagram of an embodiment of a door activated interlock system 400 that may be employed within the work vehicle of FIG. 1. In the illustrated embodiment, the door activated interlock system 400 includes the front implement actuator assembly 204 and the rear implement actuator assembly 304. The door activated interlock system 400 also includes the sensor 402 configured to output a signal indicative of the state of the access door. In addition, the door activated interlock system 400 includes a controller 404 communicatively coupled to the front implement actuator assembly 204, to the rear implement actuator assembly 304, and to the sensor 402. The controller 404 is configured to receive the signal from the sensor 402 and to output instructions to the front implement actuator assembly 204 and to the rear implement actuator assembly 304.

In certain embodiments, the controller 404 is an electronic controller having electrical circuitry configured to process data from the sensor 402. In the illustrated embodiment, the controller 404 include a processor, such as the illustrated microprocessor 406, and a memory device 408. The controller 404 may also include one or more storage devices and/or other suitable components. The processor 406 may be used to execute software, such as software for controlling the front actuator assembly 204 and the rear actuator assembly 304, and so forth. Moreover, the processor 406 may include multiple microprocessors, one or more "general-purpose" microprocessors, one or more special-purpose microprocessors, and/or one or more application specific integrated circuits (ASICS), or some combination thereof. For example, the processor 406 may include one or more reduced instruction set (RISC) processors.

The memory device 408 may include a volatile memory, such as random access memory (RAM), and/or a nonvolatile memory, such as read-only memory (ROM). The memory device 408 may store a variety of information and may be used for various purposes. For example, the memory device 408 may store processor-executable instructions (e.g., firmware or software) for the processor 406 to execute, such as instructions for controlling the front implement actuator assembly 204 and the rear implement actuator assembly 304, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the front implement actuator assembly 204 and the rear implement actuator assembly 304, etc.), and any other suitable data.

The controller 404 is configured to instruct the rear implement actuator assembly 304 to move the rear implement (e.g., in response to operator input). For example, in the illustrated embodiment, the door activated interlock system 400 includes a user interface 410 communicatively coupled to the controller 404. The user interface 410 may include a display (e.g., a touch screen display), controls, other input devices and/or output devices, or a combination thereof. For example, the operator may operate controls of the user interface 410 to control the position of the front implement and/or the rear implement.

In certain embodiments, the controller 404 is configured to instruct the rear actuator assembly 304 to block movement of the rear implement while the access door is in the open state. In the illustrated embodiment, the rear implement actuator assembly 304 includes the hydraulic actuator(s) 306 configured to move the rear implement and a valve assembly 308 fluidly coupled to the hydraulic actuator(s) 306. The valve assembly 308 is configured to control fluid flow (e.g., from a hydraulic source) to the hydraulic actuator(s) 306. The controller 404 is configured to instruct the rear implement actuator assembly 304 to block movement of the rear implement by instructing the valve assembly 308 to block fluid flow to and from the hydraulic actuator(s). Accordingly, the possibility of the rear implement moving into contact with an open access door is substantially reduced or eliminated. While the rear implement actuator assembly 304 includes hydraulic actuator(s) and a valve assembly in the illustrated embodiment, it should be appreciated that in alternative embodiments, the rear implement actuator assembly may include a pneumatic actuator system, an electromechanical actuator system, any other suitable type of actuator system, or a combination thereof.

In the illustrated embodiment, the controller 404 is communicatively coupled to the drive system 120. The drive system 120 may include a motor (e.g., a hydraulic motor), a transmission, an engine, a braking system, or a combination thereof. In certain embodiments, the controller 404 is configured to control movement of the work vehicle by outputting instructions to the drive system 120 (e.g., based on input from the user interface 410). Furthermore, in certain embodiments, the controller 404 is configured to instruct the drive system 120 to block movement of the work vehicle relative to the ground surface while the access door is in the open state. For example, the controller may instruct the drive system to block hydraulic fluid flow to and from a hydraulic motor, to transition a transmission into an neutral state, to activate a braking system, or a combination thereof, among other suitable actions. In certain embodiments, the rear implement assembly may be omitted, and the controller may be configured to instruct the drive system to block movement of the work vehicle while the access door is in the open position without providing instructions to the rear implement actuator assembly.

In certain embodiments, the controller 404 is configured to output instructions to the front implement actuator assembly 204 to control the front implement. In the illustrated embodiment, the front implement actuator assembly 204 includes the hydraulic actuator(s) 206 configured to move the front implement and a valve assembly 208 fluidly coupled to the hydraulic actuator(s) 206. The valve assembly 208 is configured to control fluid flow (e.g., from a hydraulic source) to the hydraulic actuator(s) 206. In certain embodiments, the controller 404 is configured to instruct the front implement actuator assembly 204 to enable movement of the front implement while the access door is in the open state and while the access door is in the closed state (e.g., because the front implement is positioned remote from the access door). While the front implement actuator assembly 204 includes hydraulic actuator(s) and a valve assembly in the illustrated embodiment, it should be appreciated that in alternative embodiments, the front implement actuator assembly may include a pneumatic actuator system, an electromechanical actuator system, any other suitable type of actuator system, or a combination thereof. Furthermore, in certain embodiments, the front actuator assembly may be omitted.

As previously discussed, the door activated interlock system disclosed herein may be utilized on various work vehicles, such as on-road trucks, tractors, harvesters, and construction equipment, among other work vehicles. For example, a rear implement may be positioned rearward of a chassis of a light truck (e.g., pickup truck), and an actuator assembly may be configured to control a position of the rear implement. In certain embodiments, a controller may be configured to instruct the actuator assembly to block movement of the rear implement while an access door (e.g., tailgate) positioned on a rear portion of the chassis is in an open state. Accordingly, the possibility of contact between the rear implement and the access door (e.g., tailgate) is substantially reduced or eliminated. In certain embodiments, the controller may be configured to instruct a drive system of the light truck to block movement of the light truck relative to the ground surface while the access door (e.g., tailgate) is in the open state, thereby substantially reducing or eliminating the possibility of vehicle movement while the access door (e.g., tailgate) is in the open state.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An interlock system for a work vehicle, comprising:
a controller configured to output instructions to a first actuator assembly to control a first implement positioned rearward of a chassis of the work vehicle, wherein the controller is configured to instruct the first actuator assembly to block movement of the first implement while an access door of the chassis is in an open state, the access door is positioned on a rear portion of the chassis, longitudinally opposite a cab ingress/egress door positioned proximate to a forward portion of the chassis, and the controller is configured to output instructions to a second actuator assembly to control a second implement positioned forward of the chassis.

2. The interlock system of claim 1, wherein the controller is configured to instruct a drive system of the work vehicle to block movement of the work vehicle relative to a ground surface while the access door is in the open state.

3. The interlock system of claim 1, comprising the first actuator assembly, wherein the first actuator assembly is communicatively coupled to the controller.

4. The interlock system of claim 3, wherein the first actuator assembly comprises:

a hydraulic actuator configured to move the first implement; and a valve assembly fluidly coupled to the hydraulic actuator, wherein the valve assembly is communicatively coupled to the controller and is configured to control fluid flow to the hydraulic actuator;

wherein the controller is configured to instruct the first actuator assembly to block movement of the first implement by instructing the valve assembly to block fluid flow to and from the hydraulic actuator.

5. The interlock system of claim 1, wherein the controller is configured to instruct the second actuator assembly to enable movement of the second implement while the access door is in the open state and while the access door is in a closed state.

6. The interlock system of claim 1, comprising a sensor communicatively coupled to the controller, wherein the sensor is configured to output a signal indicative of a state of the access door.

7. The interlock system of claim 6, wherein the sensor is positioned on the rear portion of the chassis, on the access door, or a combination thereof.

8. The interlock system of claim 6, wherein the sensor comprises a non-contact sensor.

9. An interlock system for a work vehicle, comprising:
a controller configured to instruct a drive system of the work vehicle to block movement of the work vehicle relative to a ground surface while an access door of a chassis is in an open state, wherein the access door is positioned on a rear portion of the chassis, longitudinally opposite a cab ingress/egress door positioned proximate to a forward portion of the chassis, and the controller is configured to output instructions to an actuator assembly to control an implement positioned forward of the chassis.

10. The interlock system of claim 9, comprising a sensor communicatively coupled to the controller, wherein the sensor is configured to output a signal indicative of a state of the access door.

11. The interlock system of claim 10, wherein the sensor is positioned on the rear portion of the chassis, on the access door, or a combination thereof.

12. The interlock system of claim 10, wherein the sensor comprises a non-contact sensor.

13. The interlock system of claim 9, wherein the controller is configured to instruct the actuator assembly to enable movement of the implement while the access door is in the open state and while the access door is in a closed state.

14. The interlock system of claim 9, wherein the controller is configured to output instructions to an additional actuator assembly to control an additional implement positioned rearward of the chassis.

15. An interlock system for a work vehicle, comprising:
a sensor configured to output a signal indicative of a state of an access door positioned on an opposite longitudinal side of the work vehicle from a cab ingress/egress door, wherein the access door is configured to transition between an open state and a closed state;

a first actuator assembly configured to control a position of a first implement positioned rearward of the access door relative to a forward direction of travel; and a controller communicatively coupled to the sensor and to the first actuator assembly, wherein the controller is configured to receive the signal and to instruct the first actuator assembly to block movement of the first implement while the access door is in the open state, and the controller is configured to output instructions to a second actuator assembly to control a second implement positioned forward of the cab ingress/egress door relative to the forward direction of travel.

16. The interlock system of claim 15, wherein the sensor comprises a non-contact sensor.

17. The interlock system of claim 15, wherein the sensor is positioned on a rear portion of a chassis of the work vehicle, on the access door, or a combination thereof.

18. The interlock system of claim 15, wherein the controller is configured to instruct a drive system of the work vehicle to block movement of the work vehicle relative to a ground surface while the access door is in the open state.

19. The interlock system of claim 15, wherein the first actuator assembly comprises:
a hydraulic actuator configured to move the first implement; and a valve assembly fluidly coupled to the hydraulic actuator, wherein the valve assembly is communicatively coupled to the controller and is configured to control fluid flow to the hydraulic actuator;

wherein the controller is configured to instruct the first actuator assembly to block movement of the first implement by instructing the valve assembly to block fluid flow to and from the hydraulic actuator.

20. The interlock system of claim 15, wherein the controller is configured to instruct the second actuator assembly to enable movement of the second implement while the access door is in the open state and while the access door is in the closed state.

* * * * *